US005764882A

United States Patent [19]

Shingo

[11] Patent Number: 5,764,882
[45] Date of Patent: Jun. 9, 1998

[54] MULTIPROCESSOR SYSTEM CAPABLE OF ISOLATING FAILURE PROCESSOR BASED ON INITIAL DIAGNOSIS RESULT

[75] Inventor: Miki Shingo, Tokyo, Japan

[73] Assignee: NEC Corporation, Tokyo, Japan

[21] Appl. No.: 561,262

[22] Filed: Nov. 21, 1995

[30] Foreign Application Priority Data

Dec. 8, 1994 [JP] Japan .................... 6-304096

[51] Int. Cl.$^6$ .................................................. G06F 11/00
[52] U.S. Cl. .......................... 395/182.09; 395/182.11
[58] Field of Search .................... 395/182.09, 182.1, 395/182.11, 183.13

[56] References Cited

U.S. PATENT DOCUMENTS

| 5,023,779 | 6/1991 | Federico et al. | 395/183.17 |
| 5,163,052 | 11/1992 | Evans et al. | 395/183.07 |
| 5,408,647 | 4/1995 | Landry | 395/183.13 |
| 5,418,955 | 5/1995 | Ikeda et al. | 395/651 |
| 5,434,997 | 7/1995 | Landry et al. | 395/182.1 |
| 5,491,788 | 2/1996 | Cepulis et al. | 395/182.11 |
| 5,583,987 | 12/1996 | Kobayashi et al. | 395/182.11 |

*Primary Examiner*—Robert W. Beausoliel, Jr.
*Assistant Examiner*—Ly V. Hua
*Attorney, Agent, or Firm*—Whitham, Curtis & Whitham

[57] ABSTRACT

A multiprocessor system containing a plurality of processor boards each having at least one processor, a CPU (central processing unit) which has malfunctioned when the multiprocessor system boots up can be firmly isolated from a system bus. In this multiprocessor system, each of the plural processor boards includes a nonvolatile memory for storing therein an initial diagnosis result of each processor on this processor board. When a system boots up, a master processor in the respective processor boards is selected based upon the initial diagnosis result stored in the nonvolatile memory, and furthermore, a master processor for the entire system is selected from these selected master processors.

18 Claims, 8 Drawing Sheets

MULTIPROCESSOR SYSTEM CAPABLE OF ISOLATING FAILURE PROCESSOR BASED ON INITIAL DIAGNOSIS RESULT

BACKGROUND OF THE INVENTION

1. Field of the Invention

The present invention relates to a computer system including a multiprocessor, and more specifically, to a small/medium-scale multiprocessor system. The present invention is applied to server computer systems functioning as fault tolerant systems, and also to workstation systems with high-reliability among the small/medium-scale multiprocessor systems.

2. Description of the Related Art

Conventionally, to achieve high-speed and highly-reliable computer systems, multiprocessor systems with multiple CPUs (central processing units) have been implemented. In particular, since higher cost/performance computers are realized by using a large number of low-cost CPUs, the multiprocessor systems are useful to small/medium-scale systems.

In a computer system with multiple CPUs, there is a problem how to treat a failure CPU when the computer system boots up. Normally, a so-called "degraded" operation is carried out in such a manner that this malfunction CPU is isolated and then the system boots up.

Some large-scale computer systems have storage units which can be commonly used by all CPUs immediately after power supplies are turned ON. Diagnosis results by execution of basic instructions such as load instructions and store instructions are written into the storage units as internal initial diagnosis results of the respective CPUs. When a failure CPU exists, a system diagnostic unit (DGU) isolates this failure CPU. On the other hand, some computer systems have a register for storing an internal initial diagnosis result of a CPU. A control circuit of this register is employed in a CPU controller connected to each CPU. The DGU reads out the register within the respective CPU controllers. When there is a failure CPU, this CPU is isolated by the DGU. However, since such a specific diagnostic controller as the DGU is utilized in this conventional computer system, more expensive manufacturing cost of this computer system results.

Accordingly, in the conventional small/medium-scale multiprocessor system, the following degrade operation has been widely introduced. One CPU is previously decided as a system master CPU. When the internal initial diagnosis of this system master CPU is accomplished under normal condition, the system master CPU controls the start/end of the internal initial diagnosis of another CPU (referred to as a "slave CPU" hereinafter). When the slave CPU's operation is not ended under normal condition, the failure CPU is isolated by the system master CPU.

However, in this system, when the system master CPU has malfunctioned, the system cannot be initiated. Therefore, there is another problem that reliability of the entire system is lowered.

To solve this problem, very recently, one solution system is disclosed in U.S. Pat. No. 5,418,955. In this system, the nonvolatile memory is provided on the system bus to which a plurality of processors are connected. This nonvolatile memory holds the number for designating the system master CPU (referred to as "a master designating ID" hereinafter). When the system boot-up of the system master CPU designated by the master designating ID fails, another CPU designated by the second-order master designating ID is operated as the system master CPU.

However, according to the above-described conventional systems, when the number of processors connected to the system bus is increased, a total number of communications established between the representative CPU and the memory or the nonvolatile memory are also increased. In this memory provided on the system bus, the CPU initialization information used to perform the CPU initial diagnosis is stored. The nonvolatile memory holds the master designating ID. As a consequence, the use efficiency of the system bus is lowered. Then, there is another problem that time required to execute the initialization is increased.

Also, very recently, the multiprocessor systems with using the system bus operable under 3.3 V have been practically utilized in order to reduce power consumption and also to lower heat dissipation. However, controlling gate arrays operable under 3.3 V are costly. Thus, a processor employing such a controlling gate array is costly. This impedes higher cost/performance merits of multiprocessor systems.

SUMMARY OF THE INVENTION

An object of the present invention is to provide a multiprocessor system with high reliability by firmly isolating a failure CPU when the multiprocessor system boots up.

Another object of the present invention is to provide a multiprocessor system capable of suppressing a load given to a system bus even when the number of processors is increased.

A further object of the present invention is to provide a multiprocessor system with employment of a system bus operable under 3.3 V, capable of maintaining high cost/performance.

A multiprocessor system, according to one preferred embodiment of the present invention, comprising a plurality of processor boards each including a plurality of processors, each of the plural processor boards has a nonvolatile memory for storing therein an initial diagnosis result of each processor on this processor board. In a system boot-up a master processor in the respective processor boards is selected based upon the initial diagnosis result stored in the nonvolatile memory, and furthermore, an overall master processor of the entire system is selected from these selected master processors.

BRIEF DESCRIPTION OF THE DRAWINGS

One embodiment of the present invention may become apparent with reference to the drawings, in which.

DETAILED DESCRIPTION OF THE PREFERRED EMBODIMENTS

Referring now to drawings, a multiprocessor system according to one embodiment of the present invention will be described.

Figure 1:
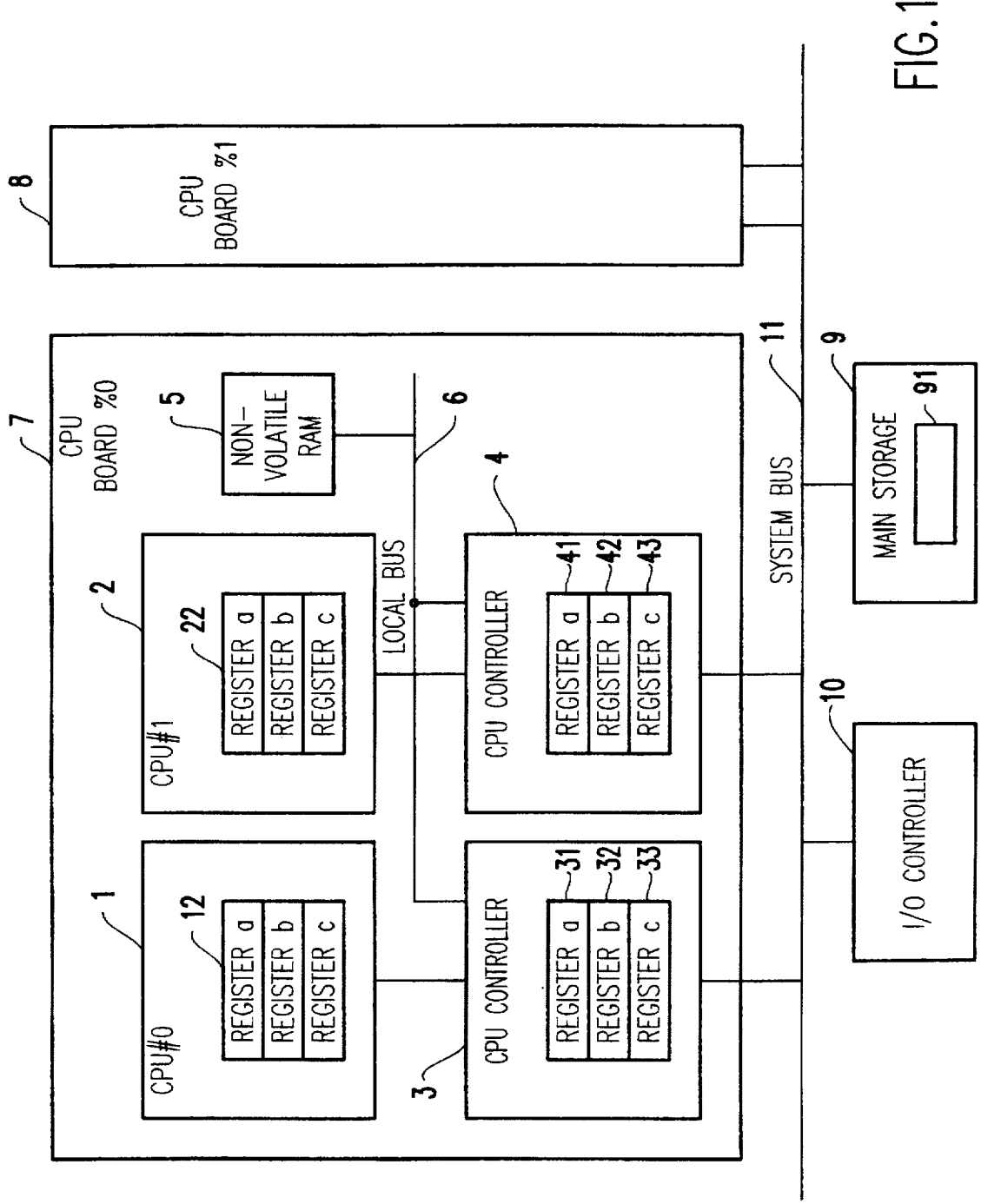
FIG. 1 schematically represents an overall arrangement of a multiprocessor system according to one embodiment of the present invention.

With reference to FIG. 1, a multiprocessor system according to one embodiment of the present invention includes two CPU (central processing unit) boards 7 and 8, which are connected to a system bus 11. Further, a main storage 9 and an I/O (input/output) controller 10 are connected to this system bus 11. Two sets of CPUs are mounted on each of the CPU boards 7 and 8. An all CPU internal initial diagnosis result storage region 91 is provided in the main storage 9, and this storage region 91 stores internal initial diagnosis results of all CPUs performed when the multiprocessor system boots up. The I/O controller 10 controls a communication established via the system bus 11. The system bus 11 is operable under a voltage of 3.3 V, and the operation frequency thereof is 50 MHz.

The CPU board 7 is equipped with two CPUs 1 and 2, two CPU controllers 3 and 4 connected to these CPUs, a nonvolatile RAM 5, and a local bus 6 used to connect the two CPU controllers 3 and 4 with the nonvolatile RAM 5.

The CPUs 1 and 2 contain register groups 12 and 22, respectively. Three registers among these register groups 12 and 22 are called as a REGISTER a, a REGISTER b and a REGISTER c.

The CPU controller 3 connected to the CPU 1 contains a CPU number storage register 31, a CPU control register 32, and a board number storage register 33. Similarly, the CPU controller 4 connected to the CPU 2 contains a CPU number storage register 41, a CPU control register 42, and a board number storage register 43. Each of these CPU controllers has 350 pins for signals and 169 input/output pins for the power supply and the GND (ground line). There are 120 pins for signals and 46 pins for the power supply, which are operable under 5 V. The CPU number storage register 31 stores therein "0", and the CPU number storage register 41 stores therein "1", as the numbers capable of identifying the CPUs connected thereto. The CPU control registers 32 and 42 control the logic connections between the CPUs and the system bus. For instance when these contents are one specific value "0", the communication is allowed between the system bus and the own CPU controller, and then both this CPU and the system bus are brought into such a condition that this CPU is logically connected to the system bus. On the other hand, when these contents are another specific value "1", the communication between the system bus and the own CPU controller is prohibited, so that this CPU is isolated from the system. Into the board number storage registers 33 and 43, the number capable of specifying the CPU board 7 on which the own CPU controller is mounted (concretely "0") is stored. It should be noted that the CPU number storage bards 31, 41 and the board number storage registers 33 and 43 are nonvolatile registers capable of holding their storage contents even under such a condition that the power supply to the multiprocessor system is turned OFF.

The local bus 6 is a bus whose voltage becomes 5 V during the logical high level, and whose operation frequency is 25 MHz.

Figure 2:
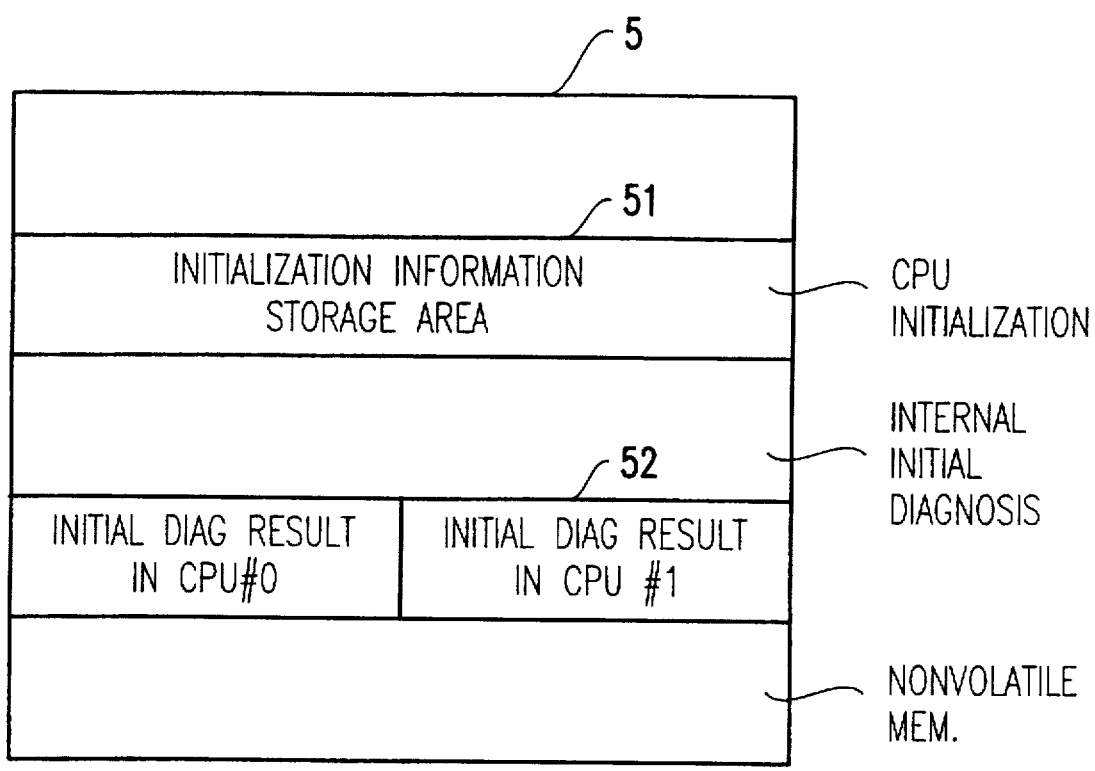
FIG. 2 schematically illustrates a content of a nonvolatile RAM employed in the multiprocessor system of FIG. 1.

As indicated in FIG. 2, the nonvolatile RAM 5 contains an initialization information storage region 51 for storing CPU initialization information required in the initialization operation containing the CPU initial diagnosis operation, and also an internal initial diagnosis result storage region 52 for storing internal initial diagnosis results of the respective CPUs provided on the board. An internal initial diagnosis of a CPU implies that this CPU is diagnosed by executing a basic instruction such as a load instruction and a store instruction. It should be noted that the nonvolatile RAM 5 does not lose its storage content when the system power supply is turned OFF.

The CPU board 8 has a structure similar to the CPU board 7. It should be also noted that the numbers other than "0" and "1" (concretely "2" and "3") are stored in the respective CPU number storage regions within the two CPU controllers, whereas the number other than "0" (concretely "1") is stored in the board number storage register.

Referring now to a flow chart shown in FIG. 3A to FIG. 3C, operations of the CPUs employed in the first embodiment will be described. This flow chart represents steps where the respective CPUs perform the slave operations as the slave CPUs, steps where the respective CPUs performs the master operations as the system master CPUs, and steps where the respective CPUs stalls as the failure CPUs. During the actual operation, the respective CPUs trace different flows from each other, depending upon various conditions. A decision of the master CPU according to the present invention is subdivided into two decision steps, namely a stage to determine a master CPU within a board (referred to as "a board master CPU" hereinafter), and a stage to determine a master CPU within an overall system (referred to as "a system master CPU" hereinafter).

First, when the multiprocessor system boots up, each of these CPUs reads out the CPU initialization information stored in the nonvolatile RAM employed in the CPU board to which the own CPU belongs, and then starts the internal initial diagnosis (step 301). Subsequently, the respective CPUs read their own CPU numbers from the CPU number storage registers provided in the CPU controller connected to the CPUs, and stores the read CPU number into the REGISTER a (step 302). After the internal initial diagnosis is accomplished, the respective CPUs judges whether or not the diagnosis is completed under normal condition based upon this diagnosis result (step 303).

When the CPU has completed the diagnosis under normal condition, a normal end code is stored via the local bus 6 into the internal initial diagnosis result storage region 52 within the nonvolatile RAM in accordance with the number of the REGISTER a, and this storage region 52 corresponds to the CPU (step 304). When the diagnosis of the CPU indicates failure, an error code is similarly stored via the local bus 6 into the corresponding internal initial diagnosis storage region 52 (step 305).

To isolate the failure CPU from the system bus 11, this failure CPU with the error code stores "1" into the CPU control register employed in the CPU controller connected to this failure CPU so as to instruct the cutting out of the CPU (step 307). Thereafter, this CPU is stalled (step 309).

On the other hand, the CPU with the normal end code waits for a predetermined time during which another CPU stores the internal initial diagnosis result (step 306), and thereafter reads the internal initial diagnosis results of all CPUs within the board via the local bus from the nonvolatile RAM. Then, this CPU stores the minimum CPU number among the CPUs with the normal code into the REGISTER b provided within the CPU. The CPU with this minimum number constitutes a candidate of the board master CPU. Then, the number stored in the REGISTER b is compared with the number stored in the REGISTER a so as to check whether or not the CPU corresponds to such a CPU having the minimum CPU number among the CPUs with the normal code within the board. Namely, a judgement is made as to whether or not the CPU corresponds to the candidate of the board master CPU (step 310).

Now, when the CPU does not correspond to such a CPU having the minimum CPU number among the CPUs with the normal code within the board, the CPU waits processor intercommunication interruption issued from the board master CPU for a predetermined time period, which indicates a statement of the board master CPU (step 312), in the case where the processor intercommunication interruption is issued from the board master CPU during this time period, it is decided that the CPU becomes the slave CPU. As a consequence, the CPU executes the slave operation for waiting the operation instruction issued from the system master CPU (step 315). On the other hand, when there is no interruption during this time period, since it is judged that the candidate of the board master CPU cannot be operated under normal condition, the respective CPUs access to the internal initial diagnosis result storage regions within the nonvolatile RAM in order to acquire the minimum CPU number of the CPU with normal code, which corresponds to the CPU having the larger CPU number than the numbers stored in the REGISTER b of the own board. The acquired number is stored in the REGISTER b (step 316). Then, a judgement is again made as to whether or not the CPU is the candidate of the board master CPU (step 310).

On the other hand, when the CPU corresponds to such a CPU having the minimum CPU number among the CPUs with normal code within the board, a processor intercommunication interruption is issued to all of the remaining CPUs employed in the board so as to make a statement of the board master (step 311).

When this processor intercommunication interruption succeeds, it is confirmed that the CPU is operated as the board master CPU. However, when this interrupt operation is not issued in a predetermined time, it is recognized that there is a failure other than the execution of the basic instruction, and then an error code is stored in the internal diagnosis result storage region (step 305). Then, "1" is set to the CPU control register employed in the CPU controller connected to the CPU, so that the CPU is isolated from the system bus 11 (step 307). As a consequence, this CPU is stalled (step 309). It should be noted that the error code in this case may be preferably set to a code different from the code issued when the CPU fails the internal initial diagnosis. A storage area of the error code may be selected to another proper area.

Next, a description will be made of the decision stage of the system master CPU. First, the board master CPU employed in each of the boards reads its own board number from the board number storage register employed in the CPU controller connected to the CPU, and stores the read board number into the REGISTER b employed in the CPU (step 317). Then, "0" equal to the minimum number among the board numbers connected to the system bus is set to the internal REGISTER c of the CPU (step 318).

The content of the REGISTER b is compared with that of the REGISTER c (step 319). When both contents of the REGISTER b and REGISTER c are equal to each other, the main storage 9 is initialized (step 320). Also, the processor intercommunication interruption is issued to all CPUs provided in the system so as to state the system master CPU (step 322). If the processor intercommunication interruption fails (step 325), then a similar process operation to that effected when the internal initial diagnosis is not ended under normal condition is carried out, and then is stalled (step 309). When the processor intercommunication interruption succeeds, the internal initial diagnosis results of the respective CPUs stored in the nonvolatile RAM provided on the CPU board to which the CPU belongs are stored in the all CPU internal initialization diagnosis storage region 91 of the main storage 9 (step 327). Thereafter, the master operation is executed (step 329).

When there is no coincidence in the comparison between the contents of the REGISTER b and the REGISTER c employed in the CPU (step 319), the board master CPU thereof waits for the system master CPU statement issued from the system master CPU for a predetermined time (step 321). If the interruption is issued from the system master CPU during this time period, then the internal initial diagnosis results of the respective CPUs stored in the nonvolatile RAM on the CPU board to which the CPU belongs are written into the all CPU internal initial diagnosis result storage region 91 of the main storage 9 (step 326), and this CPU Is operated as the slave CPU (step 328). When no interruption is issued during the predetermined time period, 1 is added to the content of the REGISTER c into which the CPU board number of the candidate of the system master CPU is stored (step 324). Then, the CPU board number of the candidate of the system master CPU is compared with the board number (step 319).

While representing a concrete example, the operations of this first embodiment will be explained.

It is assumed in the following description that the CPUs provided on the CPU board 7 are a "CPU a" (namely, CP1 shown in FIG. 1) and a "CPU b" (namely, CPU2 shown in FIG. 1), whereas the CPUs provided on the CPU board 8 are a "CPU c" and a "CPU d", and then CPU numbers thereof are selected to be "0", "1", "2" and "3", respectively. Also, it is assumed that the CPU a contains a failure to execute a basic instruction, whereas the CPU b, CPUs and CPU d are operable under normal conditions. Furthermore, the board numbers of the CPU boards 7 and 8 are selected to be "0" and "1", respectively.

When the power supply of the system is turned ON, the CPU a, CPU b, CPU c, and CPU d start their internal initial diagnosis thereof (step 301). Next, the respective CPUs read their own CPU numbers from the CPU number storage registers provided in the CPU controllers connected to the CPUs, and store the read CPU numbers in the REGISTER a (step 302). That is, "0" is stored into the REGISTER a of the CPU a, "1" is stored into the REGISTER a of the CPU b, "2" is stored into the REGISTER a of the CPU c, and "3" is stored into the REGISTER a of the CPU d.

After the respective CPUs have accomplished their own internal initial diagnosis, they judge whether or not the diagnosis is completed under normal condition based on their diagnosis results (step 303). Since the CPU a fails the diagnosis, the error code is written into the internal initial diagnosis result storage region 52 stored in the nonvolatile RAM 5 on the CPU board 7 to which the CPU a belongs (step 305). Thereafter, to isolate the CPU from the system, "1" is stored into the CPU control register 32 orovided in the CPU control unit 3 connected to the CPU, so that an instruction to isolate the CPU from the system is made (step 307). As a result, the CPU a is stalled (step 309).

The CPU b, CPU c and CPU d which have completed the diagnosis write normal end codes into the internal initial diagnosis result storage regions of the nonvolatile RAM on the boards to which these CPUs belong (step 304). Thereafter, after waiting for a predetermined time period so that the other CPUs have stored the internal initial diagnosis results (step 306), the internal initial diagnosis results of all the CPUs within the respective boards are read from the nonvolatile RAM via the local bus, and then the minimum CPU number among the CPU's with normal code is stored into the REGISTER b provided in the CPU (step 308). That is, "1" is stored into the REGISTER b by the CPU b, and "2" is stored into the REGISTER b by the CPU c and the CPU d, respectively. The CPU's with the minimum CPU number are candidates of the board master CPU of the respective boards. Then, the number stored in the REGISTER b is compared with the number stored in the REGISTER a so as to judge whether or not the CPU corresponds to the CPU having the minimum number among the CPUs ended under normal condition within the board, namely the candidate of the board master CPU (step 310). Since the REGISTER a in the CPU d stores "3" therein and the REGISTER b stores "2" therein, the CPU is not equal to the CPU having the minimum CPU number among the CPUs with a normal code. Accordingly, as the slave CPU, the CPU waits the processor intercommunication interruption indicative of the board master CPU statement issued from the board master CPU during a predetermined time period (step 312). When during this time period, the processor intercommunication interruption is issued from the board master CPU (CPU c), it is confirmed that this CPU becomes the slave CPU. Thus, this CPU waits for an operation instruction from the system master CPU (step 315). If there is no interruption during this time period, then since it is so judged that the CPU c assumed as the candidate of the board master CPU cannot be operated under normal condition, "3" is stored into the REGISTER b (step 316). This number is the second minimum CPU number of the CPU with a normal code.

On the other hand, since the CPU numbers of the CPU b and CPU c correspond to the minimum CPU number with the normal code within the board and also the content of the REGISTER a is coincident with the content of the REGISTER b, the CPU b and CPU c issue the processor intercommunication interruption to other CPUs provided in the board in order to make the board master statement (step 311). When the CPU b and the CPU c completes the board master statement under normal condition, these CPU b and CPU c become the board master CPUs (step 313). When each of them fails the processor intercommunication interruption fails, the error code is stored into the internal initial diagnosis storage region within the nonvolatile RAM employed in the board (step 305), and the failure CPU is isolated from the system bus (step 307).

Next, both of the CPU b and the CPU c, which become the board master CPUs within the respective boards, store the board numbers read out from the board number registers within the CPU controllers connected to the CPUs into the REGISTER b (step 317). Also, the number "0" is set into the REGISTER c as the candidate number of the system master CPU board (step 318). That is, the CPU b stores "0" into the REGISTER b, and "0" into the REGISTER c. The CPU c stores "1" into the REGISTER b and "0" into the REGISTER C. Then, a comparison is made between the contents of the REGISTER b and the REGISTER C (step 319).

Since the content of the REGISTER b is equal to the content of the REGISTER c in the CPU b, the main storage 9 is initialized (step 320), and the system master CPU statement is made by employing the processor intercommunication interruption with respect to all of the CPUs used in the system (step 322). If this interruption succeeds, then the internal initial diagnosis results of the CPU a and the CPU b provided in the board are written into storage regions of the main storage 9, corresponding to the all CPU internal initial diagnosis result storage region 91 (step 327). Thereafter, the operation is advanced to such an operation as the system master CPU (step 329).

Since the content of the REGISTER b is not coincident with the content of the REGISTER c in the CPU c, this CPU c waits for the system master CPU statement issued from the system master CPU namely CPU b for a predetermined time period (step 321). When the interruption is issued from the system master CPU, the internal initial diagnosis results of the CPU c and CPU d stored in the nonvolatile RAM within the CPU board 8 to which the CPU belongs are written into storage regions of the main storage 9, corresponding to the all CPU internal initial diagnosis result storage region 91 (step 326), and then the CPUs are operated as the slave CPUs (step 328). If no interruption is issued within the predetermined time period, then it is judged that the CPU b cannot be operated under normal condition, and "1" is added to the value of the REGISTER c so as to set this value to "1" (step 324).

In the above-described flow chart, the explanations are made based upon the following assumption. That is, both of the CPU which is not ended under normal condition during the internal initial diagnosis, and the CPU to which the processor intercommunication interruption is not issued can write the error codes into the internal initial diagnosis result storage regions (step 305). However, there may be some cases that a failure CPU could not actually perform such an operation. Thus, the respective CPUs may be preferably arranged as follows: A judgement is made that such a CPU whose internal initial diagnosis result storage region contains no normal code is operated under abnormal condition, so that this CPU executes its own process.

If all CPUs provided in a certain board, then there is a storage region within the all CPU initial diagnosis result storage region 91 in the main storage 9, into which the diagnosis result is not stored. Also, in this case, it is preferable to arrange such that the CPU into which the diagnosis result is not stored is operated under abnormal condition. A similar judgement is made when the interruption fails at the step 325. In these cases, the position abnormal condition occurrence and the abnormal condition occurrence reason can be investigated from the diagnosis result remaining in the nonvolatile RAM. It should be noted that in the above-described first embodiment, when the candidate of the system master CPU fails in the processor intercommunication interruption, even when these are other CPUs with the normal code within the board, it is judged that all of the CPUs within this board are malfunctioning. Alternatively, it may be so arranged that other CPUs with the normal code are newly selected as the board master CPU.

As described above, according to the multiprocessor system of the first embodiment of the present invention, since the system master CPU is dynamically determined, even when the first selected CPU cannot be operated as the master CPU, this CPU may be replaced by another CPU, so that the system can be initiated. Thus, it is possible to realize the multiprocessor system with high reliability.

Even when a failure happens to occur in the hardware under control by the system bus and no diagnosis result is stored in the main storage, since the internal initial diagnosis result of the CPU can be investigated by utilizing the information remaining in the nonvolatile RAM operated on the local bus, the error detection ratio can be improved.

In particular, according to the first embodiment, when the board master CPU and the system master CPU are determined, a confirmation is made of such a fact that the processor intercommunication interruption can succeed (steps 313 and 325). As a consequence, only such a CPU with the normal code in the internal initial diagnosis, but also the processor intercommunication interruption could be made may become the board/system master CPU. Therefore, there is an effect that reliability of the overall system can be increased.

More specifically, in the first embodiment, since the operation voltage of the system bus is 3.3 V and the operation voltage of the local bus is 5 V, approximately ⅓ of the entire pins the CPU controller are operable at 5 V. Thus, the controlling gate array unit of this portion is operable at 5 V, which may realize the low-cost arrangement, as compared with that operable at 3.3 V. These operation voltages may be substituted by other operation voltages.

Some of the CPU boards may have only one CPU. Moreover, a portion of CPUs may be directly connected to the system bus, but not be provided on the CPU board. This case is similar to such a case that there is a CPU board on which a single CPU is mounted.

Although both of the CPU initialization information and the internal initial diagnosis result are stored in the nonvolatile RAM in the above-explained first embodiment, storage units may be separately provided so as to independently store them.

According to the above-described first embodiment, the CPU with the error code in either the internal initial diagnosis or the processor intercommunication interruption, the CPU control register in the CPU controller to isolate the CPU from the system bus. However, there may be the actual case that the failure CPU cannot isolate the CPU from the system bus. When such a difficult case happens to occur, the failure CPU remains connected to the system bus. This may cause reliability of the system to be lowered while issuing an abnormal signal to the system bus. This difficult case could be improved in accordance with a multiprocessor system according to a second embodiment of the present invention.

Figure 3A:
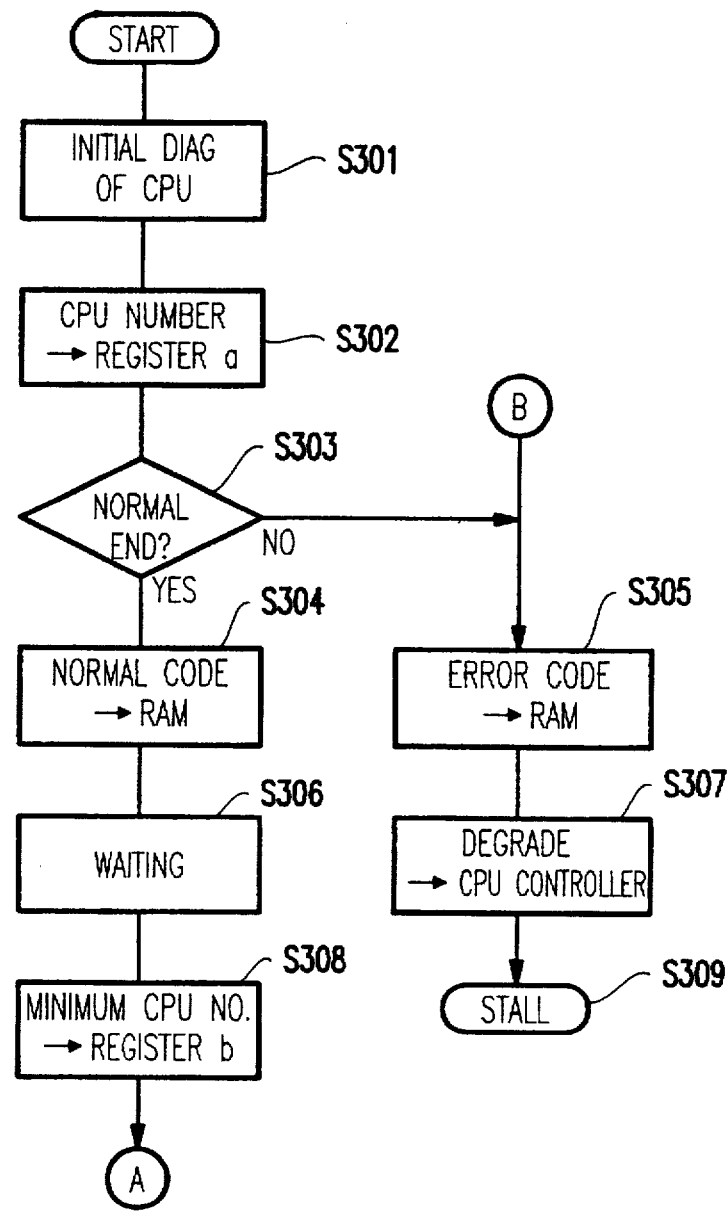
FIG. 3A is a first part of a flow chart for indicating flow operations of the respective CPUs in the multiprocessor system according to a first embodiment of the present invention.
Figure 3B:
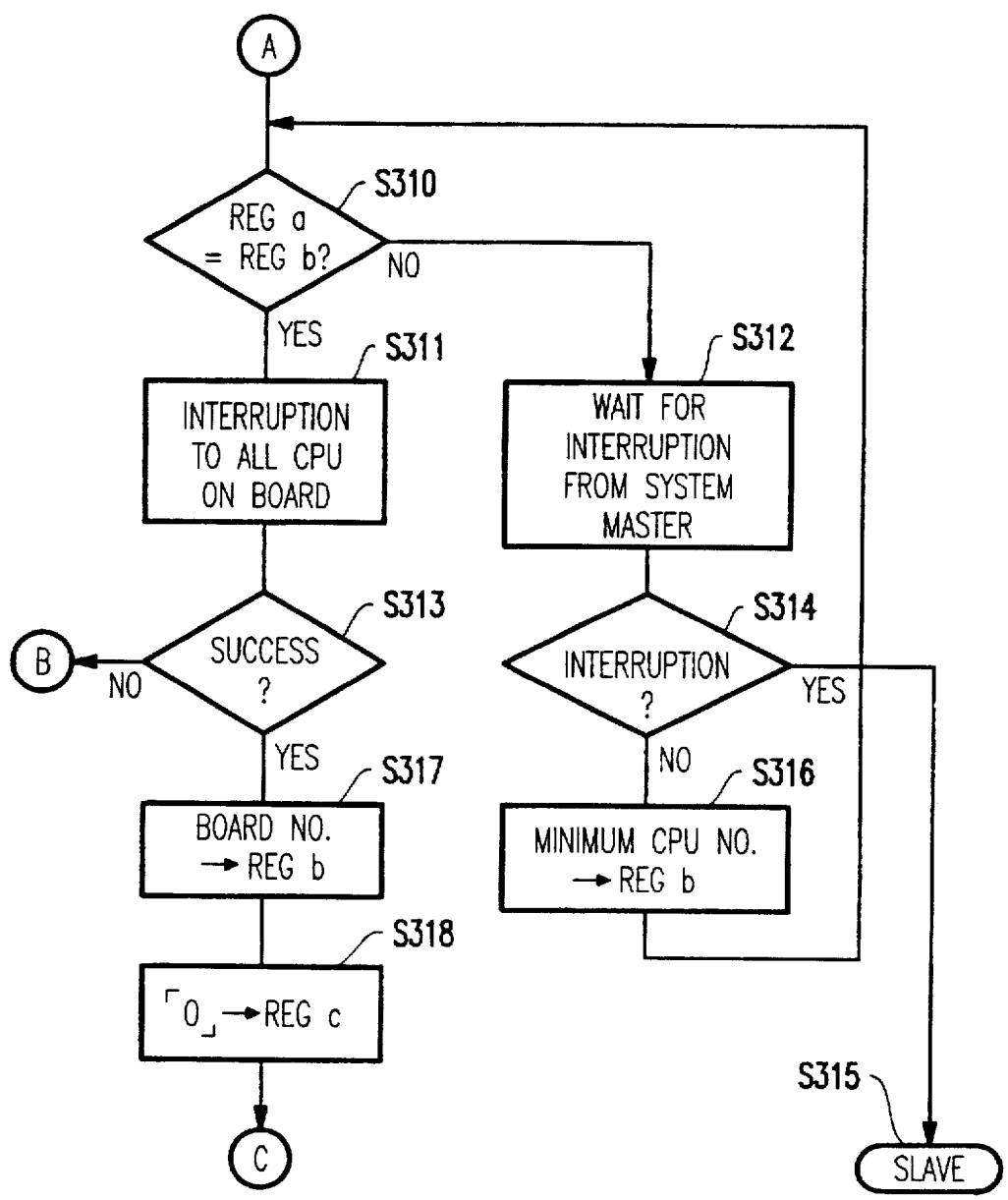
FIG. 3B is a second part of a flow chart according to a first embodiment of the present invention.
Figure 3C:
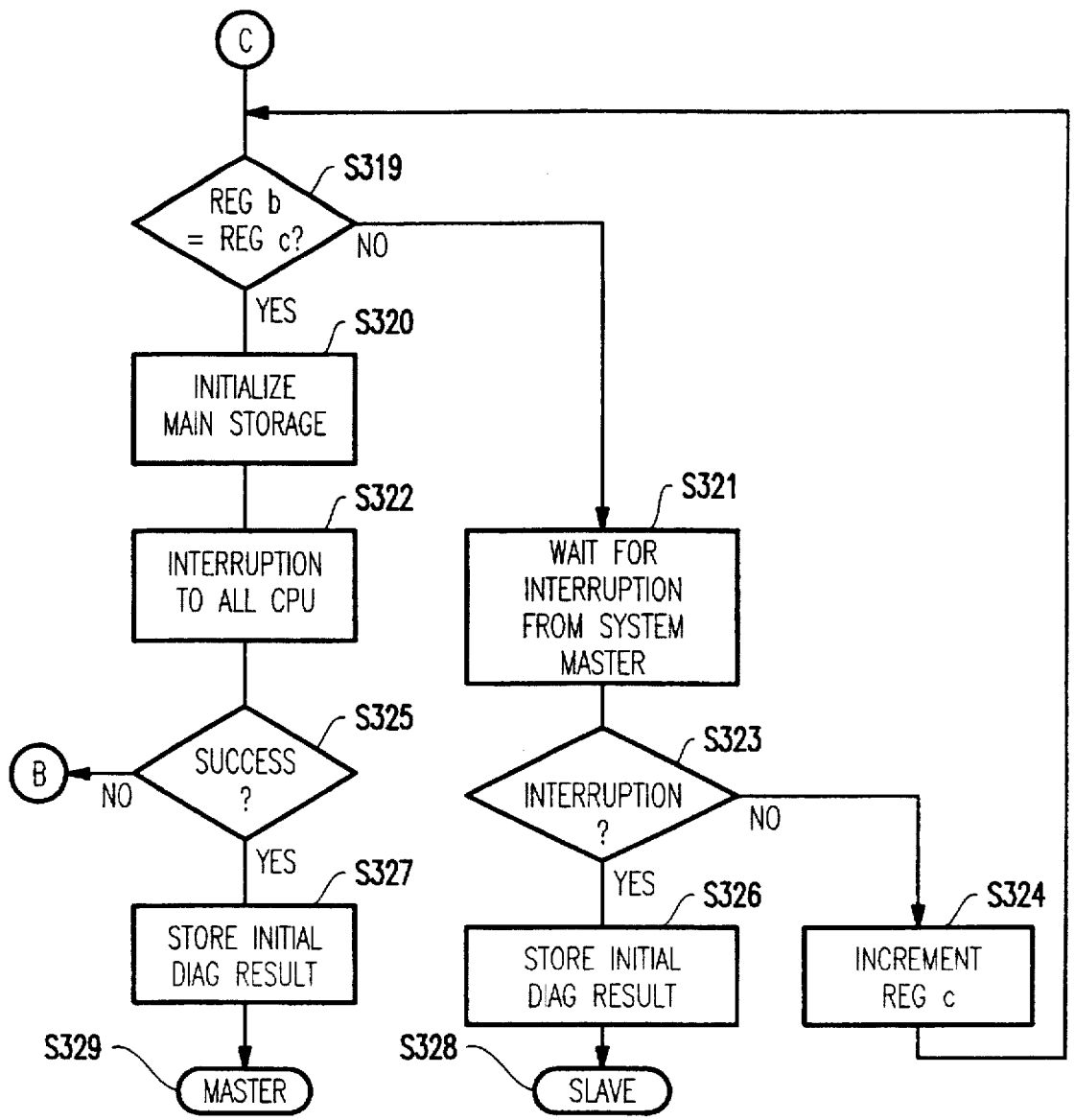
FIG. 3C is a third part of a flow chart according to a first embodiment of the present invention.
Figure 4A:
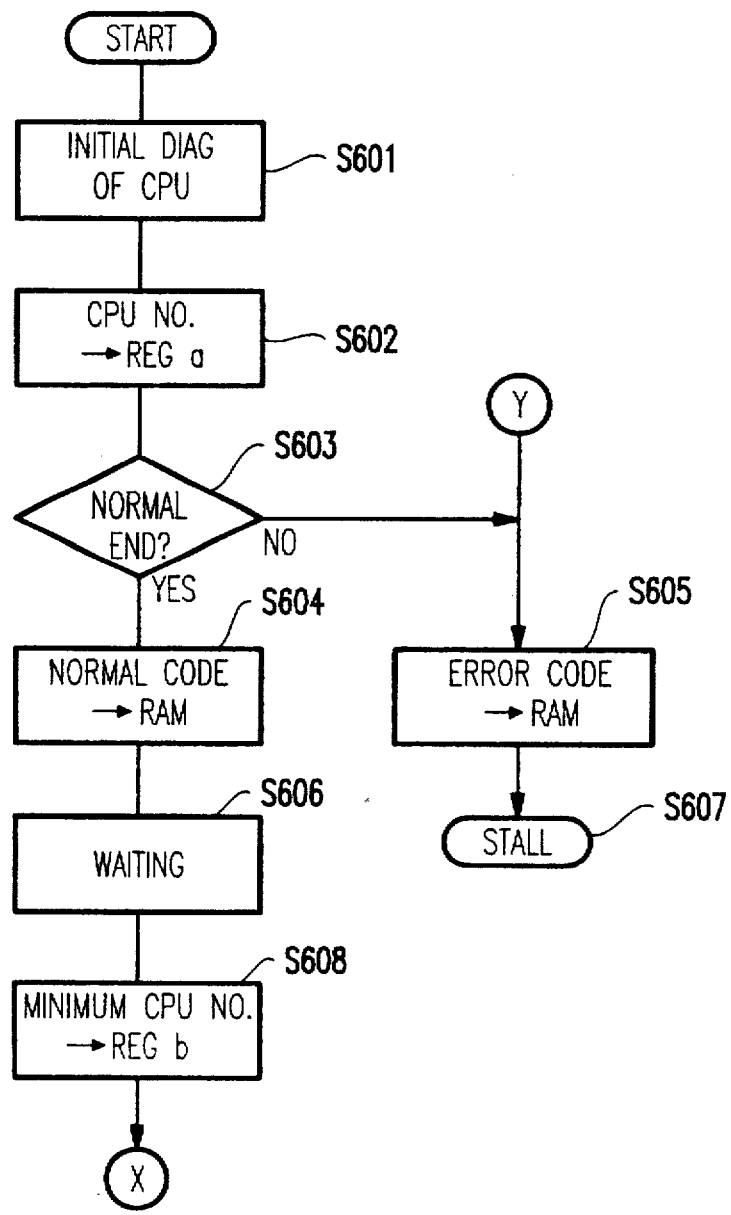
FIG. 4A is a first part of a flow chart for representing flow operations of the respective CPUs in the multiprocessor system according to a second embodiment of the present invention.
Figure 4B:
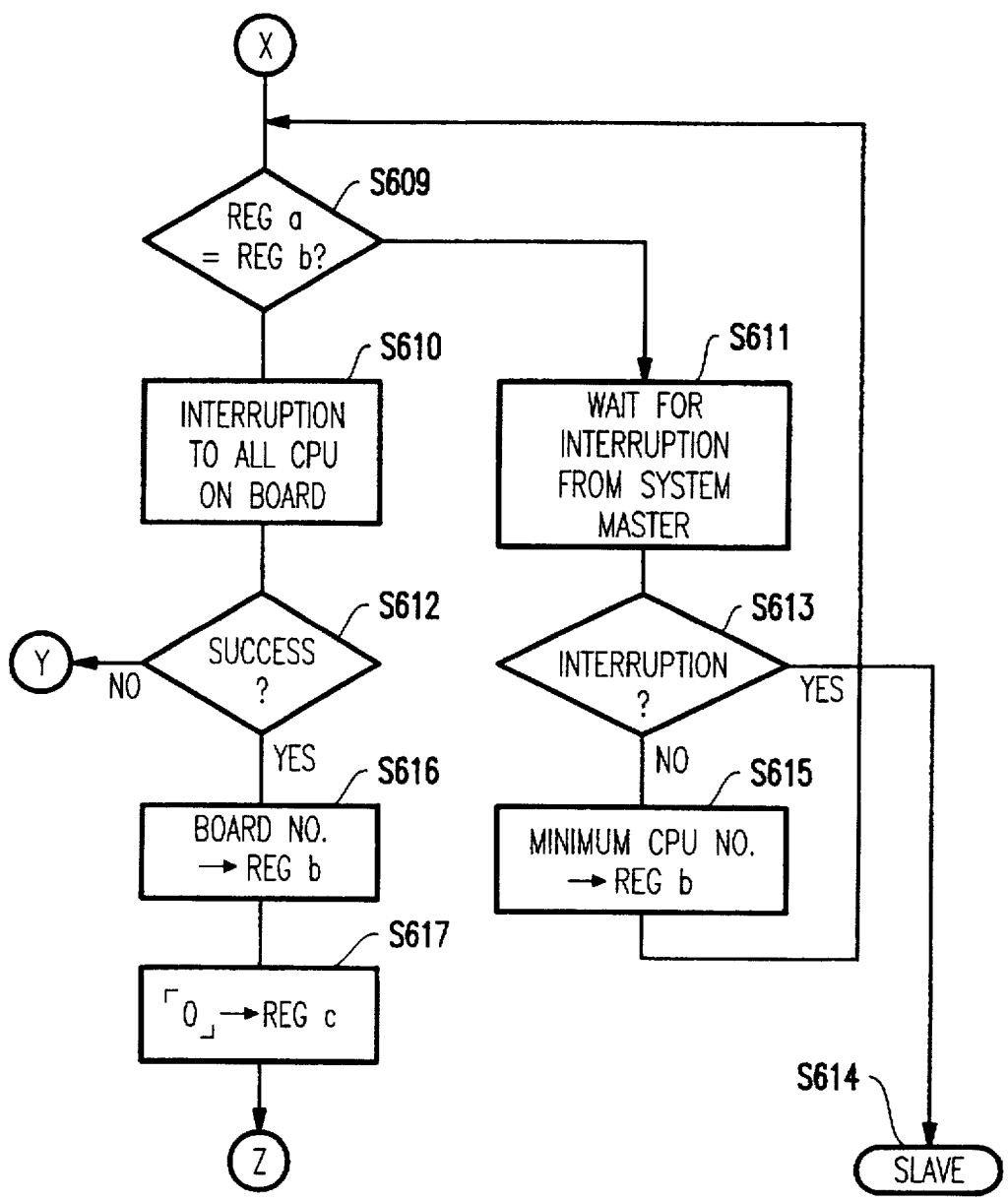
FIG. 4B is a second part of a flow chart for representing flow according to a second embodiment of the present invention.
Figure 4C:
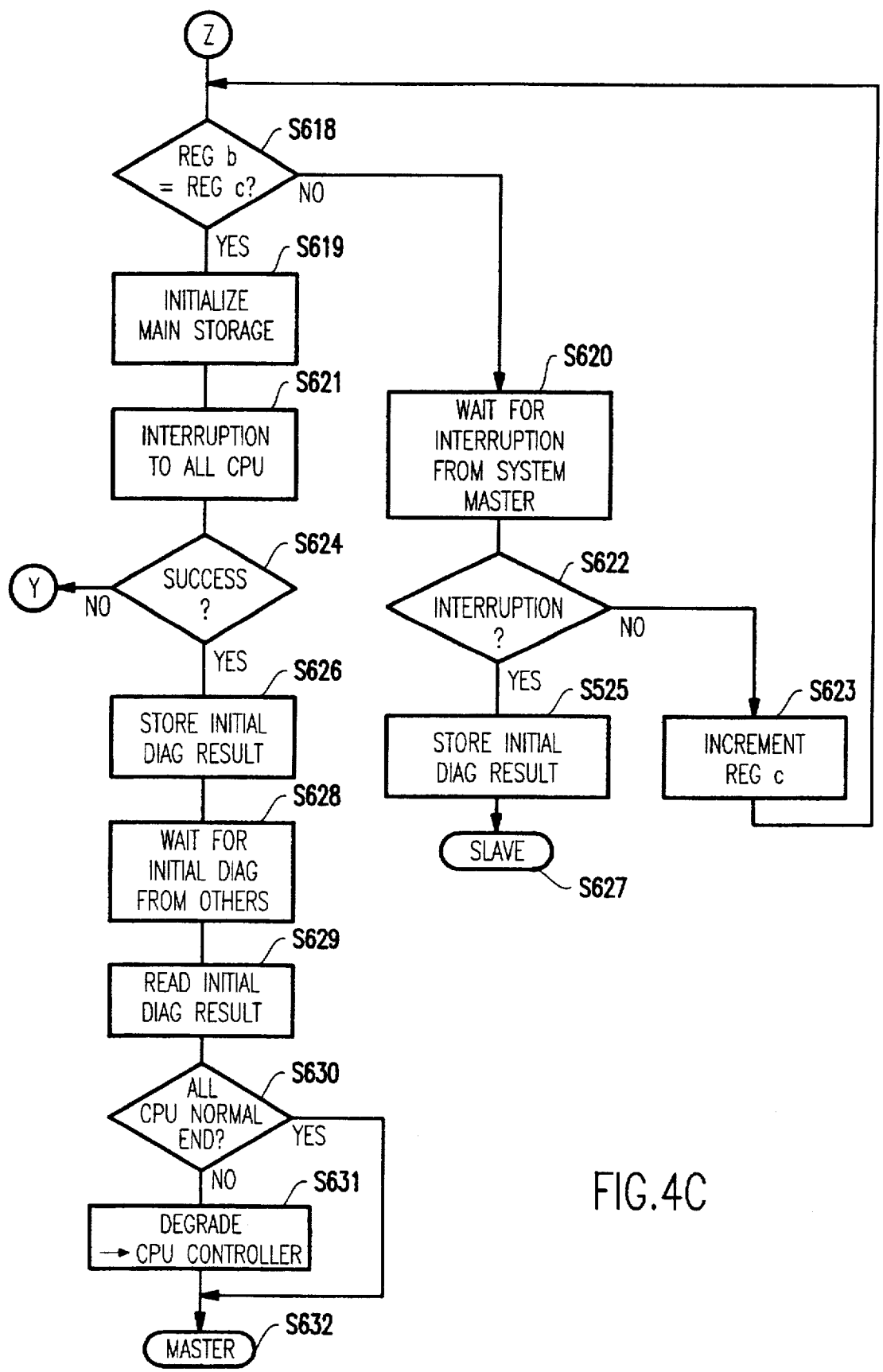
FIG. 4C is a third part of a flow chart for representing flow according to a second embodiment of the present invention.

Although an overall arrangement of the second embodiment is similar to that of the first embodiment, the multiprocessor system of the second embodiment is so arranged that not only the CPU in the own board but also the CPUs in other board can access to a CPU control register in a CPU controller. in this second embodiment, the respective CPUs are operated in accordance with a flowchart shown in FIG. 4A to 4C, instead of the flowchart indicated in FIG. 3A to FIG. 3c.

Referring now to FIG. 4A to FIG. 4C, operations of this second embodiment will be described.

First, when the multiprocessor system boots up, each of these CPUs reads out the CPU initialization information stored in the nonvolatile RAM employed in the CPU board to which the CPU belongs, and then starts the internal initial diagnosis (step 601). Subsequently, the respective CPUs read their own CPU numbers from the CPU number storage registers provided in the CPU controller connected to the CPUs, and stores the read CPU number into the REGISTER a (step 602). After their own internal initial diagnosis is accomplished, the respective CPUs judge whether or not the diagnosis is completed under normal condition based upon this diagnosis result (step 603).

When the CPU has completed the diagnosis under normal condition, a normal end code is stored via the local bus 6 into the internal initial diagnosis result storage region 52 within the nonvolatile RAM in accordance with the number of the REGISTER a, and this storage region corresponds to the CPU (step 604). When the CPU fails the diagnosis, an error code is similarly stored via the local bus into the corresponding internal initial diagnosis storage region (step 605)

Different from the operation of the first embodiment, the CPU with the error code is not isolated from the system bus 11, but is stalled (step 607).

On the other hand, the CPU with normal end code waits for a predetermined time during which another CPU stores the internal initial diagnosis result (step 606), and thereafter reads the internal initial diagnosis results of all CPUs within the board via the local bus from the nonvolatile RAM. Then, this CPU stores the minimum CPU number among the CPUs with the normal code into the REGISTER b provided within the CPU (step 608). The CPU with this minimum CPU number constitutes a candidate of the board master CPU. Then, the number stored in the REGISTER a is compared with the number stored in the REGISTER b so as to check whether or not the CPU corresponds to such a CPU having the minimum CPU number among the CPUs with the normal code. Namely, a judgement is made as to whether or not the CPU corresponds to the candidate of the board master CPU (step 609).

Now, when the CPU does not correspond to such a CPU having the minimum CPU number among the CPUs with a normal code within the board, a processor intercommunication interruption issued from the board master CPU waits for a predetermined time period, which indicates a statement of the board master CPU (step 611). In the case where the processor intercommunication interruption is issued from the board master CPU during the predetermined time period, it is decided that the CPU becomes the slave CPU. As a consequence, the CPU executes the slave operation for waiting the operation instruction issued from the system master CPU (step 614). On the other hand, if no interruption is made during the predetermined time period, since it is judged that the candidate of the board master CPU cannot be operated under normal condition, the respective CPUs access to the internal initial diagnosis result storage regions within the nonvolatile RAM in order to acquire the minimum CPU number of the CPU with normal code, which corresponds to the CPU having the larger number than the numbers stored in the REGISTER b of the board. The acquired number is stored in the REGISTER b (step 615).

On the other hand, when the CPU corresponds to such a CPU having the minimum CPU number among the CPUs with the normal code within the board, a processor intercommunication interruption is issued to all of the remaining CPUs in the board so as to make a statement of the board master (step 610).

When this processor intercommunication interruption succeeds, it is confirmed that the CPU is operated as the board master CPU. However, when this interruption operation is not ended under normal condition, it is recognized that there is a failure other than the execution of the basic instruction, and then an error code is stored in the internal diagnosis result storage region (step 605), and is stalled (step 607).

Next, the board master CPU employed in each of the boards reads the its board number from the board number storage register in the CPU controller connected to the CPU, and stores the read board number into the REGISTER b in the CPU (step 616). Then, "0" equal to the minimum number among the board numbers connected to the system bus is set to the internal REGISTER c of the CPU (step 617).

The content of the REGISTER b is compared with that of the REGISTER c (step 618). When both contents of the REGISTER b and REGISTER c are equal to each other, the main storage 9 is initialized (step 619). Also, the processor intercommunication interruption is issued to all CPUs provided in the system so as to state the system master CPU (step 621). If the processor intercommunication interruption fails, then an error code is stored (step 605), and is stalled. When the processor intercommunication interruption succeeds, the internal initial diagnosis results of the respective CPUs stored in the nonvolatile RAM provided on the CPU board to which the CPU belongs are stored in the all CPU internal initialization diagnosis storage region 91 of the main storage 9 (step 626). After the system master CPU waits for a predetermined time period so that another board master CPU has completed the diagnosis result writing operation into the all CPU internal initial diagnosis result storage region 91 (step 628), this system master CPU reads the all CPU internal initial diagnosis result storage region 91 (step 629) so as to judge whether or not a failure CPU exists (step 630). At this time, it may be recognized that the operation of the CPU into which the diagnosis result is not stored is ended under abnormal condition.

When there is such a CPU whose operation is not ended under normal condition, "1" is set to the CPU control register in the CPU controller of this CPU, so that the CPU is isolated from the system bus (step 631), and the system master CPU starts the master operation (step 632).

When the operations of all of the CPUs are ended under normal condition, the operation is directly moved to the master operation (step 632).

According to the second embodiment of the present invention, even when the failure CPU could not be isolated from the system bus, the system master CPU recognizes such a CPU whose operation was not ended under normal condition, and isolates this CPU from the system bus. Thus, reliability of the multiprocessor system can be increased.

As apparent from the above-described description, the master CPU is dynamically determined, so that the CPU failed at boot-up can be surely isolated, and thus the multiprocessor system with higher reliability can be realized.

In particular, only the CPU succeeding in the processor intercommunication interruption is selected as the master CPU. Therefore, the reliability of the system can be further increased.

When the system boots up, since the system master CPU isolates the CPU in which the initial diagnosis was not ended under normal condition, more reliable systems can be realized.

The local bus is provided on the CPU board connected to the system bus, and the storage unit is provided thereon. As a consequence, even when the number of processors is increased, the loads given to the system bus can be suppressed, so that the boot-up speed of the system can be increased.

Moreover, in such a system that the operation voltage of the system bus is selected to be 3.3 V, the operation voltage of the local bus is set to 5 V. It is possible to realize a multiprocessor system with low power consumption and also low heat dissipation, while maintaining high cost/performance.

What is claimed is:

1. A multiprocessor system comprising a plurality of processor boards, each of which includes a plurality of processors, wherein:

each of said processor boards has a nonvolatile memory for storing therein an initial diagnosis result of each of said processors on the processor board, a master processor in each of said processor boards is selected based on the initial diagnosis result stored in said nonvolatile memory at system boot-up, and an overall master processor of said multiprocessor system is selected from master processors, said system further comprising means for issuing an interruption to one of all of the processors in the boards and all of the processors in the system for acknowledging a normal condition of the initial diagnosis result, wherein, with said nonvolatile memory each processor executes initial diagnosis simultaneously.

2. The multiprocessor system according to claim 1, wherein the master processors are simultaneously determined.

3. The multiprocessor system according to claim 1, wherein only one said master processor is determined in each processor board, and only one said overall master processor is determined in the system.

4. A multiprocessor system for connecting a plurality of processor boards with each other via a system bus, each of said processor boards including a plurality of processors, wherein:

each of said processor boards includes:
    a processor controller, provided with each of said processors, for controlling the connection of said processors to said system bus; and
    a nonvolatile memory, commonly used in said processor controller, for storing a result of an initial diagnosis of each of said processors on said processor board;

each of said processors includes:
    means for selecting a master processor in said processor boards based on the initial diagnosis result stored in said nonvolatile memory; and
    means for selecting an overall master processor for the multiprocessor system from master processors selected in said processor boards.

5. The multiprocessor system as claimed in claim 4, wherein said means for selecting the master processor in each of said processor boards selects as the master processor such a processor having a minimum CPU number from the processors in which the initial diagnosis is ended under normal condition within the processor board.

6. The multiprocessor system as claimed in claim 5, wherein said means for selecting the overall master processor of the multiprocessor system selects the processor having the minimum CPU number on the processor board as the overall master processor of this system.

7. The multiprocessor system as claimed in claim 6, wherein said nonvolatile memory is connected via a local bus to said processor controller.

8. The multiprocessor system as claimed in claim 6, further includes:
    a storage connected to said system bus for storing therein the initial diagnosis result stored in said nonvolatile memory of said processor board.

9. The multiprocessor system as claimed in claim 6, wherein said processor controller isolates the corresponding processor from said system bus when the initial diagnosis of said corresponding processor is not ended under normal condition.

10. The multiprocessor system as claimed in claim 6, wherein said processor further includes means for issuing an interruption to all of the processors provided within said processor board when said processor is selected as the master processor of said processor board.

11. The multiprocessor system as claimed in claim 6, wherein said processor further includes means for issuing an interruption to all of the processors provided within said multiprocessor system when said processor is selected as the master processor of said multiprocessor system.

12. The multiprocessor system according to claim 4, wherein the master processors are simultaneously determined.

13. The multiprocessor system according to claim 1, further comprising means for issuing an interruption to one of all of the processors in the boards and all of the processors in the system for acknowledging a normal condition of the initial diagnosis result, wherein, with said nonvolatile memory, each processor executes initial diagnosis simultaneously, wherein only one said master processor is determined in each processor board, and only one said overall master processor is determined in the system initial diagnosis.

14. A multiprocessor system for connecting a plurality of processor boards with each other via a system bus, each of said processor boards including a plurality of processors, wherein:

each of said processor boards includes:
a processor controller, provided with each of said processors, for controlling the connection of said processors to said system bus; and
a nonvolatile memory, commonly used in said processor controller, for storing a result of an initial diagnosis of each of said processors on said processor board;

each of said processors includes:
means for selecting a master processor in said processor boards based on the initial diagnosis result stored in said nonvolatile memory; and
means for selecting an overall master processor for the multiprocessor system from master processors selected in said processor boards, wherein said means for selecting the master processor in each of said processor boards selects as the master processor such a processor having a minimum CPU number from the processors in which the initial diagnosis is ended under normal condition within the processor board, wherein said means for selecting the overall master processor of the multiprocessor system selects the processor having the minimum CPU number on the processor board as the overall master processor of this system, said multiprocessor system further including:
a storage connected to said system bus for storing therein the initial diagnosis result stored in said nonvolatile memory of said processor board,
wherein said processor selected as the overall master processor of the multiprocessor system indicates a processor controller corresponding to the processor where the initial diagnosis is not ended under normal condition so as to isolate said processor from said system bus based upon the initial diagnosis result stored in said storage.

15. A multiprocessor system for connecting a plurality of processor boards with each other via a system bus, each of said processor boards including a plurality of processors, wherein:

each of said processor boards includes:
a processor controller, provided with each of said processors, for controlling the connection of said processors to said system bus; and
a nonvolatile memory, commonly used in said processor controller, for storing a result of an initial diagnosis of each of said processors on said processor board;

each of said processors includes:
means for selecting a master processor in said processor boards based on the initial diagnosis result stored in said nonvolatile memory; and
means for selecting an overall master processor for the multiprocessor system from master processors selected in said processor boards, wherein said means for selecting the master processor in each of said processor boards selects as the master processor such a processor having a minimum CPU number from the processors in which the initial diagnosis is ended under normal condition within the processor board, wherein said means for selecting the overall master processor of the multiprocessor system selects the processor having the minimum CPU number on the processor board as the overall master processor of this system, wherein said processor further includes means for issuing an interruption to all of the processors provided within said multiprocessor system when said processor is selected as the master processor of said multiprocessor system, wherein both of said system bus and the local bus of each processor board are driven at different voltage levels from each other.

16. In a multiprocessor system for connecting a plurality of processor boards with each other via a system bus, each of said processor boards including a plurality of processors and a nonvolatile memory for storing therein an initial diagnosis result of each of said processors on the processor board, a master processor selecting method comprising:

a first step for selecting a plurality of master processors, one for each of said processor boards; and a second step for selecting an overall master processor of the multiprocessor system from the master processors selected in said first step, further comprising a step of issuing an interruption to one of all of the processors in the boards and all of the processors in the system for acknowledging a normal condition of the initial diagnosis result, wherein, with said nonvolatile memory, each processor executes initial diagnosis simultaneously.

17. The master processor selecting method in the multiprocessor system as claimed in claim 16, wherein said first step selects as a master processor, a processor having a minimum CPU number from the processors in which the initial diagnosis is ended under normal condition in each of said processor boards, and said second step selects the processor having the minimum CPU number on the processor board as the overall master processor of the multiprocessor system.

18. The master processor selecting method in the multiprocessor system as claimed in claim 17, wherein at said first step, when the processor having a minimum CPU number is selected as the master processor of said processor board, the processor issues an interruption to all of said processors within said processor board, and at said second step, when said processor is selected as the overall master processor of the multiprocessor system, the processor issues an interruption to all of the processors within the multiprocessor system.

* * * * *